United States Patent
Dangler et al.

(10) Patent No.: US 9,751,636 B2
(45) Date of Patent: Sep. 5, 2017

(54) DYNAMIC DETECTION OF LANDING GEAR DEPLOYMENT

(71) Applicant: International Business Machines Corporation, Armonk, NY (US)

(72) Inventors: John R. Dangler, Rochester, MN (US); David T. Nelson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/969,020

(22) Filed: Dec. 15, 2015

(65) Prior Publication Data

US 2017/0166323 A1   Jun. 15, 2017

(51) Int. Cl.
| | | |
|---|---|---|
| B64D 45/00 | (2006.01) | |
| B64D 43/02 | (2006.01) | |
| B64C 25/28 | (2006.01) | |
| B64C 25/30 | (2006.01) | |

(52) U.S. Cl.
CPC .......... *B64D 45/0005* (2013.01); *B64C 25/28* (2013.01); *B64C 25/30* (2013.01); *B64D 43/02* (2013.01)

(58) Field of Classification Search
CPC .... B64D 45/0005; B64D 43/02; B64C 25/28; B64C 25/30
See application file for complete search history.

(56) References Cited

U.S. PATENT DOCUMENTS

| | | |
|---|---|---|
| 3,946,358 A | 3/1976 | Bateman |
| 4,792,799 A | 12/1988 | Grove |
| 4,916,447 A | 4/1990 | Vermilion et al. |
| 5,745,053 A | 4/1998 | Fleming, III |
| 5,839,080 A * | 11/1998 | Muller .................. G05D 1/0676 340/970 |
| 6,008,742 A | 12/1999 | Groves |
| 6,157,891 A | 12/2000 | Lin |
| 6,927,702 B2 | 8/2005 | Wiplinger |
| 8,175,762 B2 | 5/2012 | Trotter et al. |
| 2015/0122945 A1 * | 5/2015 | Kavounas ............... B64C 25/30 244/102 R |

OTHER PUBLICATIONS

Aircraft Components Inc., "P/N 2037 Landing Gear Warning System for Certified Retractable Aircraft."
Aircraft Spruce and Specialty Co., "Amphibian Gear Warning System."

* cited by examiner

*Primary Examiner* — Todd Melton
(74) *Attorney, Agent, or Firm* — Lieberman & Brandsdorfer, LLC

(57) ABSTRACT

The embodiments described herein relate to dynamically detecting landing gear deployment of an aerial vehicle. A set of flight measurements is dynamically generated and stored. The set of measurements may include altitude, distance to a destination, and airspeed. Each of these measurements is compared to a respective threshold value to produce a landing scenario indication. The comparison includes ascertaining that the vehicle is within a defined above ground level based on the altitude measurement, ascertaining that the vehicle is within a defined distance to a destination based on the distance to a destination measurement, and ascertaining that the airspeed measurement is below a maximum gear extension speed. The produced indication is converted into a landing gear protocol.

20 Claims, 4 Drawing Sheets

DYNAMIC DETECTION OF LANDING GEAR DEPLOYMENT

BACKGROUND

The embodiments described herein relate generally to aircraft landing protocols. More specifically, the embodiments described herein relate to dynamically managing deployment of an aircraft landing protocol during flight.

All too often, in the final stages of landing an aerial vehicle, such as an aircraft, pilots become distracted and fail to deploy the landing gear. Such failure may cause a "gear up" or "belly" landing, which often results in substantial damage to the aircraft, and may cause serious injury or death. Sensor based systems, such as radar altimeters, have been implemented in landing gear configuration warning systems. However, these systems are typically expensive, and are therefore rarely used in small aircraft. Furthermore, many sensor based systems are operationally limited. For example, many sensor based systems are only capable of detecting an improper landing gear configuration within a relatively short distance above the ground, resulting in a very limited time window for the pilot(s) to take notice and react.

SUMMARY

The aspects described herein include a method, system, and computer program product for dynamically managing deployment of a landing protocol of an aerial vehicle.

According to one aspect, a method is provided for dynamically managing deployment of a landing protocol of an aerial vehicle. A set of flight measurements is dynamically generated and stored. The set of measurements may include altitude, distance to destination, and airspeed. Each of these measurements is compared to a respective threshold value to produce a landing scenario indication. The comparison includes ascertaining that the vehicle is within a defined above ground level based on the altitude measurement, ascertaining that the vehicle is within a defined distance to a destination based on the distance to a destination measurement, and ascertaining that the airspeed measurement is below a maximum gear extension speed. The produced indication is converted into a landing gear protocol.

According to another aspect, a system is provided to support dynamic detection of landing gear deployment. The system includes a processing device in communication with memory. A functional unit is in communication with the processing device to dynamically generate and store a set of flight measurements. The set of measurements may include altitude, distance to destination, and airspeed. Each of these measurements is compared to a respective threshold value to produce a landing scenario indication. The comparison includes ascertaining that the vehicle is within a defined above ground level based on the altitude measurement, ascertaining that the vehicle is within a defined distance to a destination based on the distance to a destination measurement, and ascertaining that the airspeed measurement is below a maximum gear extension speed. The produced indication is converted into a landing gear protocol.

According to yet another aspect, a computer program product is provided to support dynamic detection of landing gear deployment. The computer program product includes a computer-readable storage device having computer-readable program code embodied therewith. The program code is executable by a processor to dynamically generate and store a set of flight measurements. The set of measurements may include altitude, distance to a destination, and airspeed. Each of these measurements is compared to a respective threshold value to produce a landing scenario indication. The comparison includes ascertaining that the vehicle is within a defined above ground level based on the altitude measurement, ascertaining that the vehicle is within a defined distance to a destination based on the distance to a destination measurement, and ascertaining that the airspeed measurement is below a maximum gear extension speed. The produced indication is converted into a landing gear protocol.

Other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not all embodiments, unless otherwise explicitly indicated.

DETAILED DESCRIPTION

It will be readily understood that the components of the embodiments described herein, as generally described and illustrated in the Figures herein, may be arranged and designed in a wide variety of different configurations. Thus, the following detailed description of the embodiments of the method, computer program product, and system, as presented in the Figures, is not intended to limit the scope of the claims, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments described herein will be best understood by reference to the drawings, wherein like parts are designated by like numerals throughout. The following description is intended only by way of example, and simply illustrates certain selected embodiments of devices, systems, and processes that are consistent with the claims herein.

Figure 1:
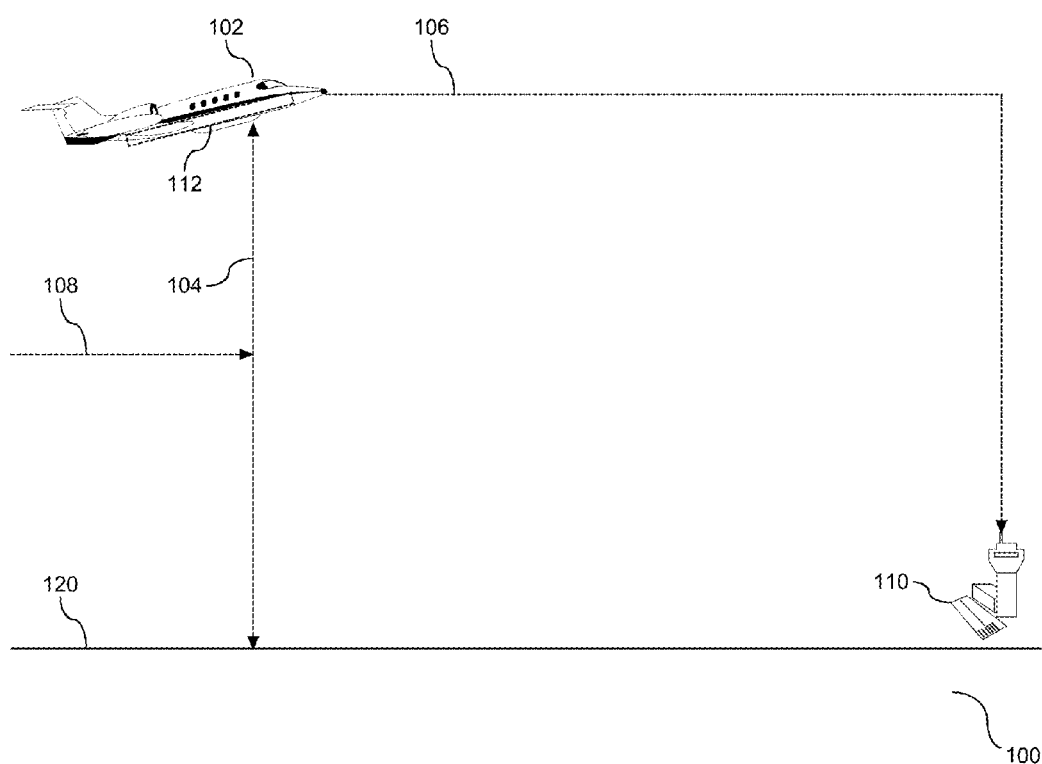
FIG. 1 depicts a block diagram illustrating an exemplary aerial vehicle, according to an embodiment.

With reference to FIG. 1, a block diagram (100) is provided illustrating an exemplary aerial vehicle (102) during flight. At a given point in time during flight, measurements associated with the vehicle (102) and a flight path or patterns may be assessed. As shown herein, the vehicle (102)

is displayed with respect to a destination (110) and ground (120). At any point in time, instrumentation may be employed to determine distance (106) between the vehicle (102) and the destination (110), altitude of the aerial vehicle (104) with respect to ground (120), and airspeed (108).

As is known in the art, altitude of an aircraft may be set (and communicated) by referencing a (mean) sea level. The sea level refers to an average surface level of one or more oceans of the Earth, and may serve as a reference point by which height measurements may be measured. For example, in the context of aviation, the height above sea level is a term of art that refers to the altitude of an aircraft relative to the mean sea level. Thus, the height above sea level does not indicate a distance between the aerial vehicle and the ground. To capture the distance between the aerial vehicle and the ground, an above ground level measurement may be calculated as the distance of the aerial vehicle above the ground. In one embodiment, the altitude (104) is based on the height above sea level. For example, the altitude (104) is an above ground level, and may be calculated as the difference between the aircraft height above sea level and the sea level ground elevation of the terrain below the aircraft.

The distance to the destination (106) is a remaining distance of the aerial vehicle to an intended destination. As used herein, the term "destination" may refer to any intended landing point. There may be one or more destinations during an aerial flight, including a final destination and any intermediate destinations between the starting point and the final destination. For the sake of simplicity, the distance to the destination (106) is shown as a horizontal and vertical distance from the aerial vehicle (102) to the destination (110). However, it is to be understood and appreciated that the distance to the destination (106) may be calculated using any distance metric in accordance with the embodiments described herein. For example, the distance to the destination (106) may be calculated as the Euclidean (i.e., straight line) distance from the aerial vehicle (102) to the destination (110). The airspeed (108) is a speed of the aerial vehicle through the air. Devices for measuring airspeed are known in the art, and a further description of such devices will not be provided herein.

The altitude (104), distance to the destination (106), and airspeed (108) are referred to herein as a set of flight measurements. The set of flight measurements may be dynamically generated and updated in real-time during flight by dynamically obtaining the altitude (104), the distance to the destination (106), and the airspeed (108). The altitude (104), the distance to the destination (106), and the airspeed (108) will fluctuate based on various stages of flight, such as when the aerial vehicle is preparing to land. Accordingly, a dynamically generated set of flight measurements may be used to indicate a potential landing scenario.

The aerial vehicle (102) is shown with landing gear (112). During a typical flight, the landing gear (112) is deployed in the final stages of landing either manually by an operator of the aerial vehicle (102), or automatically by a computer system (not shown) of the aerial vehicle (102). However, the operator of the aerial vehicle (102) may forget to deploy the landing gear (112) during the landing process. At the same time, the set of flight measurements may indicate a potential landing scenario. In one embodiment, the computer system of the aerial vehicle (102) dynamically generates the set of flight measurements, and determines that the landing gear (112) should be deployed based on the generated set of flight measurements. Further details regarding the computer system of the aerial vehicle (102) will be provided below with reference to FIG. 5.

Figure 2:
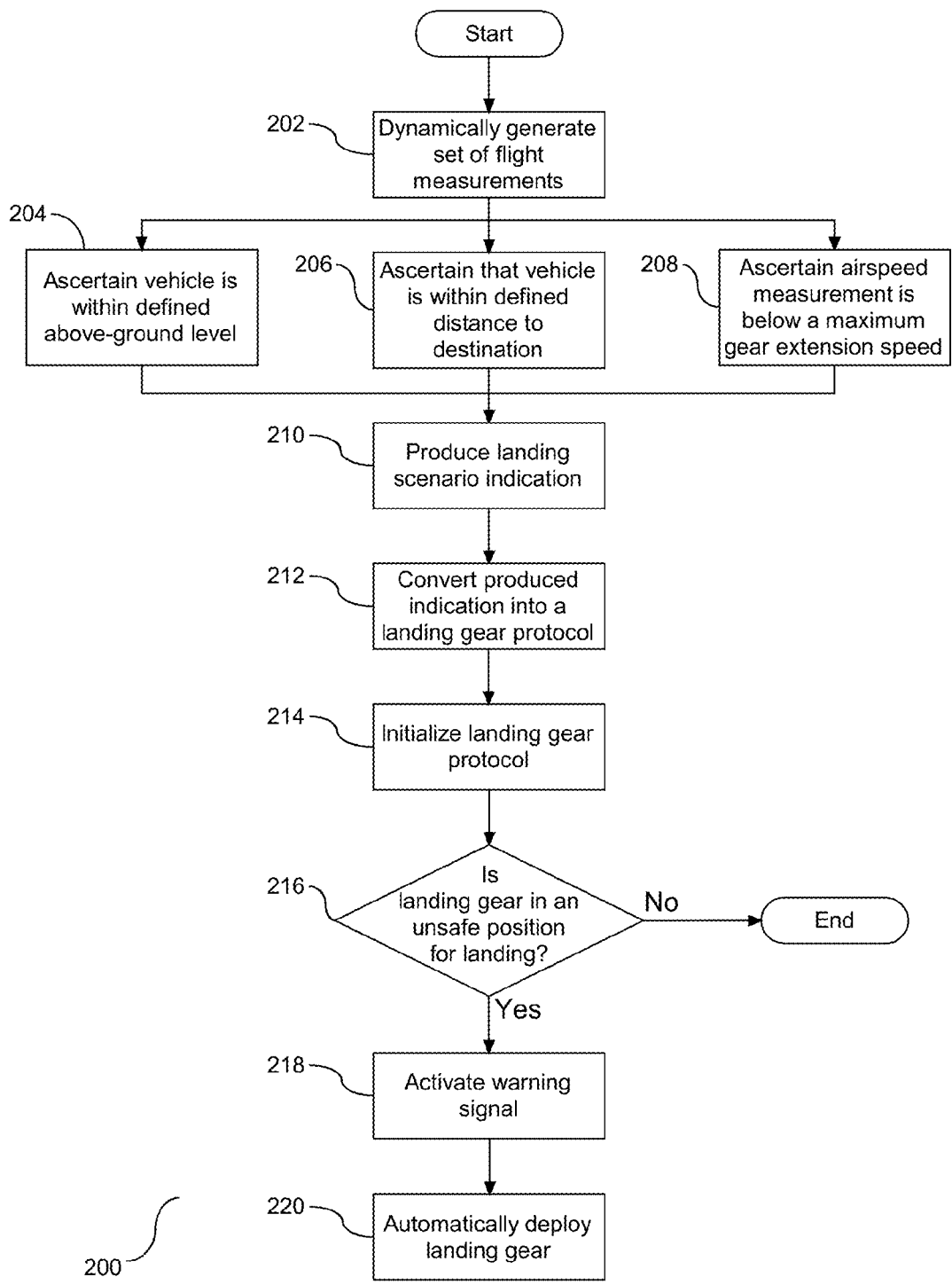
FIG. 2 depicts a flowchart illustrating a process for dynamically managing deployment of a landing protocol.

With reference to FIG. 2, a flowchart (200) is provided illustrating a process for dynamically managing landing gear deployment. A set of aerial vehicle flight measurements is dynamically generated (202). In one embodiment, generating the set of measurements at step (202) includes dynamically gathering altitude, distance to a destination, and airspeed measurement data. The data at step (202) may be gathered by active measuring devices. In one embodiment, one or more of the measurements are dynamically obtained at step (202) via a global positioning satellite (GPS) system operatively coupled to the computer system of the aerial vehicle. However, other means of dynamically obtaining measurements that are known in the art may be implemented, in accordance with the embodiments described herein.

An altitude measurement is a measurement of the distance of the aerial vehicle above the ground. As discussed above in FIG. 1, in order to capture such the distance between the aerial vehicle and the ground, an above ground level measurement may be calculated as the distance of the aerial vehicle above the ground. In one embodiment, the above ground level is generated at step (202) based on the height above sea level. For example, the above ground level may be calculated as the difference between the height above sea level and the sea level ground elevation.

Based on the measurements assessed at step (202), it is ascertained that the aerial vehicle is within a defined distance above ground level based on the altitude measurement (204). The defined distance above ground level is an above ground level of a point of interest, such as an above ground level corresponding to a nearest airport in the vicinity of the aerial vehicle. However, it is to be understood and appreciated that any ground level reference may be used as a defined distance above ground level. In one embodiment, the ascertainment at step (204) may be made by comparing a difference between the above ground level measurement and the defined distance above ground level to an altitude threshold, and also determining that the difference is below the altitude threshold. In the case of a nearest airport, nearest airport data may be dynamically obtained, including altitude data for the nearest airport, and the above ground level measurement of the aerial vehicle may be used to ascertain that the aerial vehicle is below a threshold distance of the nearest airport. Such a comparison may be used to determine that the aerial vehicle is sufficiently close to ground level of a landing zone, such as an airport runway, which provides evidence of intent to land. Accordingly, the real-time dynamic assessment of the gathered altitude data at step (204) may be implemented as part of a process for determining a likelihood of landing.

Another indication of a likelihood of a potential landing may be derived from the distance to destination measurement. Specifically, it is ascertained that the aerial vehicle is within a defined distance to its destination based on the distance to destination measurement (206). In one embodiment, the ascertainment at step (206) may be made by comparing a difference between the distance to destination measurement and the defined distance to a distance to destination threshold, and also determining that the difference is below the distance to destination threshold. In other words, the remaining distance to the destination is compared to the destination threshold. The distance to destination threshold may be a pre-defined value. For example, if the destination is an airport, the distance remaining to the airport (i.e., the difference between the dynamically obtained distance to the airport and the defined distance to the airport) may be compared to the destination threshold. Such a comparison may be used to determine that the aerial vehicle is sufficiently close to its destination, which provides further evidence of intent to land. Accordingly, the real-time ascertainment at step (206) may be implemented as part of a process for determining a likelihood of landing.

In addition to the altitude measurement at step (204) and the distance to destination measurement at step (206), it is ascertained that the airspeed measurement is below a maximum gear extension speed (208). Such a comparison may be used to determine that the speed of the aerial vehicle is indicative of nearing a potential landing area, which provides yet further evidence of intent to land. Accordingly, the real-time ascertainment at step (208) may be implemented as part of a process for determining a likelihood of landing.

Steps (204)-(208) may be viewed as a comparison of each flight measurement to respective threshold values to determine that at least one of the dynamically obtained measurements is indicative of aerial vehicle landing behavior, and an indication is produced that an aerial vehicle is entering a landing scenario (210). In one embodiment, one of the measurements from steps (204)-(208) may activate the landing gear scenario at step (210). Similarly, in one embodiment, a combination of the measurements from steps (204)-(208) may activate the landing gear scenario at step (210). The various combinations of measurements that activate the landing gear scenario should not be considered limiting. In one embodiment, the indication at step (210) is in the form of a signal. The produced indication is converted into a landing gear protocol (212).

The landing gear protocol is initialized (214). In one embodiment, the initialization at step (214) includes determining if other configuration settings of the aerial vehicle, such as flap settings, throttle settings, power settings, air brake settings, propeller settings, etc., match a required protocol of an approach to landing. The configuration settings corresponding to the required protocol may be settings that are specific to the particular type of aerial vehicle. It is determined if the landing gear of the aerial vehicle is in an unsafe position for landing (216). A non-affirmative response to the determination at step (216) indicates that the landing gear is safely deployed, and the process ends. However, an affirmative response to the determination at step (216) indicates that the aerial vehicle is currently unprepared for a conventional landing due to the unsafe positioning of the landing gear. In one embodiment, a warning signal is activated to alert the operator of the aerial vehicle of the unsafe landing condition (218). In another embodiment, the landing gear may be automatically deployed by the aerial vehicle (220).

Figure 3:
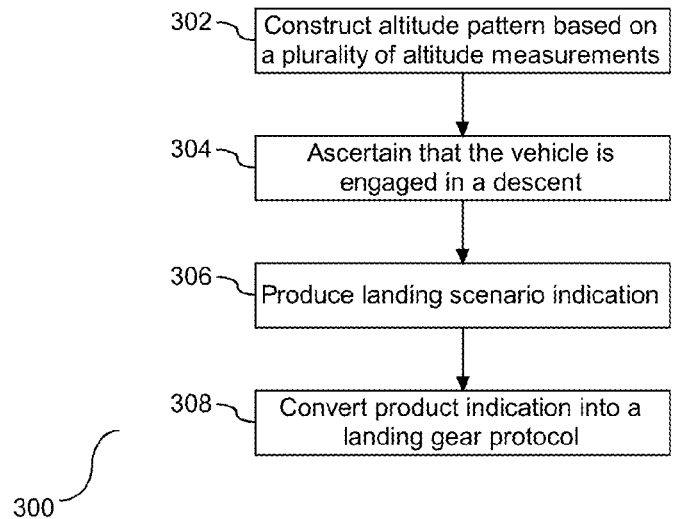
FIG. 3 depicts a flowchart illustrating a process for implementing an altitude pattern to dynamically manage deployment of a landing protocol.

In addition to a specific altitude, multiple altitude data points may be gathered and measurements may be taken for each of the gathered data points. These measurements may be used to construct altitude patterns, which may be implemented in a process for indicating a potential landing scenario. With reference to FIG. 3, a flowchart (300) is provided illustrating a process for implementing an altitude pattern to dynamically manage landing gear deployment. An altitude pattern is constructed (302). In one embodiment, the construction at step (302) is based on a plurality of altitude measurements for the current trajectory. For example, the altitude measurements may be dynamically generated and stored, as described above in FIG. 2. Based on the altitude pattern, it is ascertained that the aerial vehicle is engaged in a descent trajectory (304). In one embodiment, the ascertainment at step (304) includes determining that the aerial vehicle is undergoing a substantial descent from a cruising altitude. For example, if the altitude pattern indicates that the aerial vehicle has been at a substantially constant altitude over a given period of time (i.e., a substantially zero rate of change in altitude), this suggests that the aerial vehicle has been, and continues to be, travelling at a cruising altitude. A substantial descent from this cruising altitude may suggest an impending landing scenario. For example, a sudden and rapid decrease in altitude may indicate aerial vehicle malfunction. In one embodiment, the ascertainment at step (304) further includes comparing a rate of descent derived from the altitude pattern to a threshold rate of descent, and determining that the rate of descent is above the threshold rate of descent. That is, a threshold rate of descent may be implemented to define a substantial rate of descent. Since it has been ascertained at step (304) that the aerial vehicle is substantially descending toward the ground, a landing scenario indication is produced (306), and the produced indication is converted into a landing gear protocol (308), as discussed above in FIG. 2.

Figure 4:
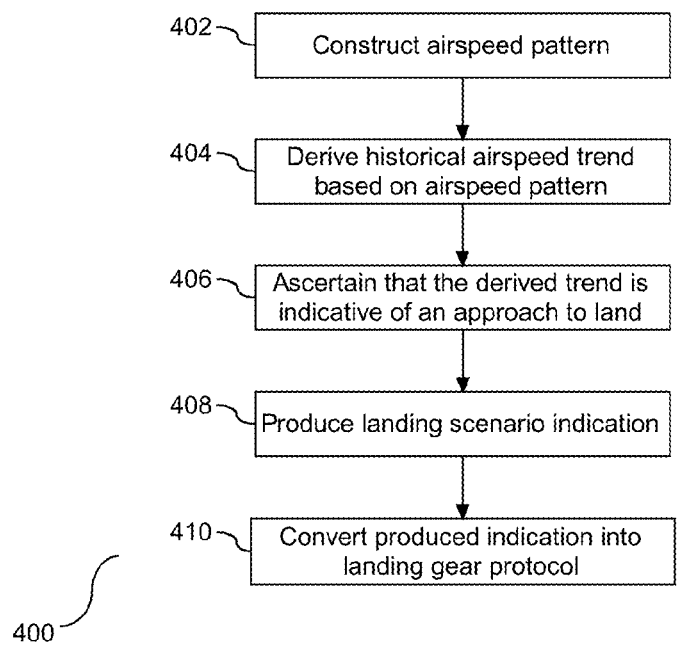
FIG. 4 depicts a flowchart illustrating a process for implementing an airspeed pattern to dynamically manage deployment of a landing protocol.

In addition to a specific airspeed measurement, multiple airspeed data points may be gathered and measurements may be taken for each of the gathered data points. These measurements may be used to construct airspeed patterns, which may be implemented in a process for indicating a potential landing scenario. With reference to FIG. 4, a flowchart (400) is provided illustrating a process for implementing an airspeed pattern to dynamically manage landing gear deployment. An airspeed pattern is constructed (402). In one embodiment, the construction at step (402) is based on a plurality of airspeed measurements for the current flight path, or trajectory. For example, the altitude measurements may be dynamically generated and stored, as described above in FIG. 2. A historical airspeed trend is derived based on the airspeed pattern (404), and it is ascertained that the derived trend is indicative of an approach to land (406). For example, if the historical airspeed trend indicates that an airspeed pattern consistent with a landing approach, this suggests that the aerial vehicle is likely approaching a landing destination. Since it has been ascertained at step (406) that the historical airspeed trend is indicative of an approach to land, a landing scenario indication is produced (408), and the produced indication is converted into a landing gear protocol (410), as discussed above in FIG. 2.

Figure 5:
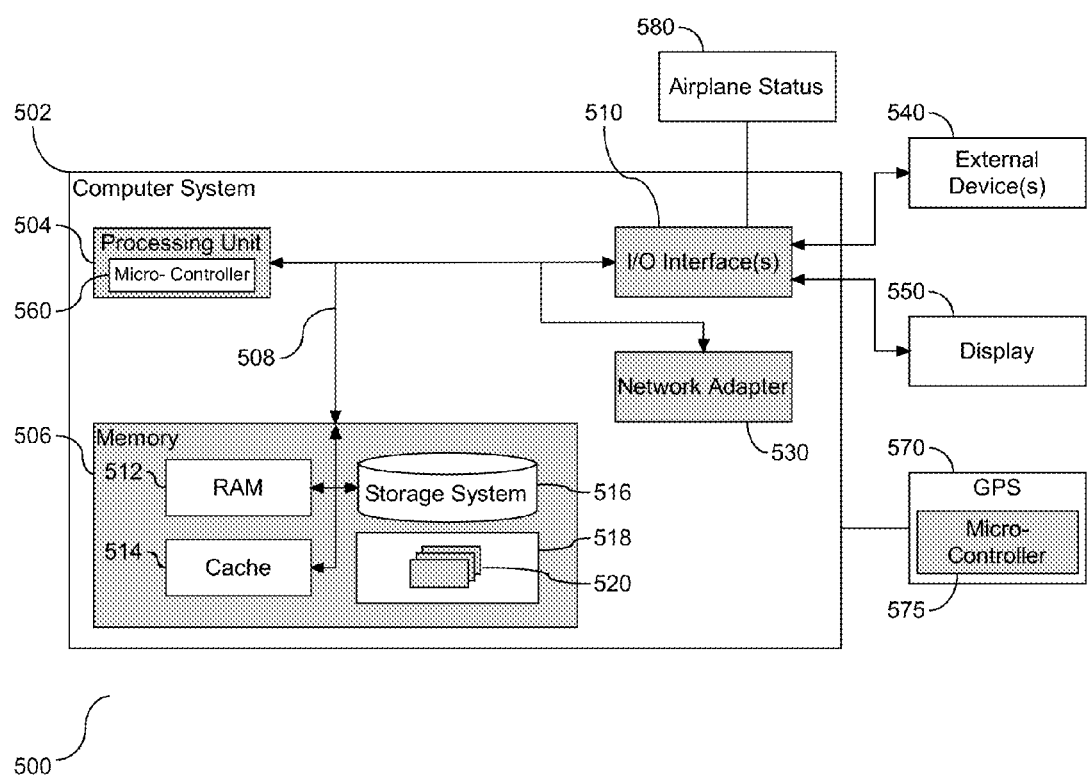
FIG. 5 depicts a block diagram illustrating a computer system to dynamically manage landing gear deployment

With reference to FIG. 5, a block diagram (500) is provided illustrating an example of a computer system (502) to dynamically manage landing gear deployment. The computer system (502) is operational with numerous other general purpose or special purpose computing system environments or configurations. Examples of well-known computing systems, environments, and/or configurations that may be suitable for use with the computer system (502) include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and the like. In one embodiment, the computer system (502) is implemented as part of a flight-based electronics system of an aerial vehicle.

The computer system (502) may be described in the general context of computer system-executable instructions, such as program modules, being executed by a computer system. Generally, program modules may include routines, programs, objects, components, logic, data structures, and so on that perform particular tasks or implement particular abstract data types. Computer system (502) may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, the computer system (502) is shown in the form of a general-purpose computing device. The components of the computer system (502) may include one or more processors, shown as processing unit (504). The components of the computer system (502) may further include, but are not limited to, a system memory (506) and a bus (508) that couples various system components including system memory (506) to processing unit (504). Bus (508) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. The computer system (502) typically includes a variety of computer system readable media. Such media may be any available media that is accessible by computer system (502) and it includes both volatile and non-volatile media, and removable and non-removable media.

Memory (506) can include computer system readable media in the form of volatile memory, such as random access memory (RAM) (512) and/or cache memory (514). The computer system (502) further includes other removable/non-removable, volatile/non-volatile computer system storage media. By way of example only, storage system (516) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (508) by one or more data media interfaces. As will be further depicted and described below, memory (506) may include at least one program product having a set (e.g., at least one) of program modules that are configured to carry out the functions of the embodiments described herein.

Program/utility (518), having a set (at least one) of program modules (520), may be stored in memory (506) by way of example, and not limitation, as well as an operating system, one or more application programs, other program modules, and program data. Each of the operating systems, one or more application programs, other program modules, and program data or some combination thereof, may include an implementation of a networking environment. In one embodiment, program modules (520) may comprise one or more tools for generally carrying out the functions and/or methodologies of the processes of FIGS. 2-4.

In one embodiment, the processing unit (504) is embedded in the electronics of an aerial vehicle, such as an aircraft. The processing unit (504) may include a microcontroller (560) for generally carrying out the functions and/or methodologies of the processes of FIGS. 2-4. For example, and in one embodiment, the microcontroller may be configured to integrate dynamically obtained measurements in order to dynamically detect deployment of the landing gear of the aerial vehicle, such as the landing gear of the aerial vehicle depicted in FIG. 1. In one embodiment, the microcontroller (560) is configured to generate a warning signal during implementation of a landing gear protocol. In another embodiment, the microcontroller is configured to automatically deploy the landing gear of the aerial vehicle during implementation of the landing protocol.

The computer system (502) may communicate with one or more external devices (540), such as a keyboard, a pointing device, etc.; a display (550); one or more devices that enable a user to interact with the computer system (502); and/or any devices (e.g., network card, modem, etc.) that enable the computer system (502) to communicate with one or more other computing devices. In one embodiment, a signal input is received by the system (502) pertaining to the airplane status (580), such as configuration input. More specifically, the airplane status (580) communicates one or more signals to the processing unit (502) with the signal input corresponding to the landing gear position, flaps, etc. In one embodiment, the signal indicates whether the different elements of the landing gear are in safe or unsafe positions. The status signal may be generated via microswitches, or other elements by which the landing gear position is detected and communicated to the system (502).

Communication between the external devices (540) and display (550) can occur via Input/Output (I/O) interface(s) (510). Still yet, the computer system (502) can communicate with one or more networks such as a local area network (LAN), a general wide area network (WAN), and/or a public network (e.g., the Internet) via network adapter (530). As depicted, network adapter (530) communicates with the other components of computer system (502) via bus (508). In one embodiment, the remote subscriber information (e.g., the received drawer build plan dataset and the destination address) may be received by the computer system (502) via the network adapter (530), and then communicated by the network adapter (530) to memory (506) via bus (508) for storage. It should be understood that although not shown, other hardware and/or software components could be used in conjunction with computer system (502). Examples, include, but are not limited to: microcode, device drivers, redundant processing units, external disk drive arrays, RAID systems, tape drives, and data archival storage systems, etc. In one embodiment, the causes the build design to be visually displayed on the computer (550).

In one embodiment, the computer system (502) is operatively connected to a global positioning satellite (GPS) system (570). The GPS system (570) may be configured to dynamically obtain altitude and/or distance to destination measurements, such as those described above in FIGS. 1-3. In one embodiment, a microcontroller (575) within the GPS system (570) may be further configured to integrate dynamically obtained data into measurements in order to dynamically detect landing gear deployment, as discussed above in FIGS. 2 and 3. For example, the microcontroller (575) of the GPS system (570) may be configured to generate a warning signal to indicate an unsafe landing condition of the aerial vehicle during implementation of a landing protocol. In another embodiment, the microcontroller (575) of the GPS system (570) may be configured to automatically deploy the landing gear of the aerial vehicle during implementation of the landing protocol.

As will be appreciated by one skilled in the art, the aspects may be embodied as a system, method, or computer program product. Accordingly, the aspects may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the aspects described herein may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for the embodiments described herein may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The embodiments are described above with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow chart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus, provide processes for implementing the functions/acts specified in the flow chart and/or block diagram block or blocks.

The flow charts and block diagrams in the Figures illustrate the architecture, functionality, and operation of possible implementations of systems, methods, and computer program products according to various embodiments. In this regard, each block in the flow charts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustration(s), and combinations of blocks in the block diagrams and/or flow chart illustration(s), can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The embodiments described herein may be implemented in a system, a method, and/or a computer program product. The computer program product may include a computer readable storage medium (or media) having computer readable program instructions thereon for causing a processor to carry out the embodiments described herein.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmissions, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The embodiments are described herein with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

The corresponding structures, materials, acts, and equivalents of all means or step plus function elements in the claims below are intended to include any structure, material, or act for performing the function in combination with other claimed elements as specifically claimed. The description of the embodiments herein has been presented for purposes of illustration and description, but is not intended to be exhaustive or limited to the embodiments in the forms disclosed. Many modifications and variations will be apparent to those of ordinary skill in the art without departing from the scope and spirit of the embodiments described herein. The embodiments were chosen and described in order to best explain the principles and the practical application, and to enable others of ordinary skill in the art to understand the various embodiments with various modifications as are suited to the particular use contemplated.

It will be appreciated that, although specific embodiments have been described herein for purposes of illustration, various modifications may be made without departing from the spirit and scope of the specific embodiments described herein. Accordingly, the scope of protection is limited only by the following claims and their equivalents.

What is claimed is:

1. A method comprising:
   dynamically generating a set of flight measurements of an aerial vehicle, including dynamically obtaining an altitude measurement, a distance to a destination measurement, and an airspeed measurement;
   storing the generated set of flight measurements;
   comparing each flight measurement to a respective threshold value to produce a landing scenario indication, wherein the comparison comprises:
      ascertaining that the vehicle is within a defined above ground level based on the altitude measurement;
      ascertaining that the vehicle is within a defined distance to a destination based on the distance to a destination measurement; and
      ascertaining that the airspeed measurement is below a maximum gear extension speed; and
   converting the produced indication into a landing gear protocol.

2. The method of claim 1, further comprising implementing the landing gear protocol, including determining that landing gear of the vehicle is in an unsafe position.

3. The method of claim 2, further comprising activating a warning signal.

4. The method of claim 2, further comprising automatically deploying the landing gear.

5. The method of claim 1, further comprising constructing an altitude pattern based on a plurality of generated altitude measurements.

6. The method of claim 5, wherein the comparison further comprises ascertaining that the vehicle is descending from a cruising altitude based on the altitude pattern.

7. The method of claim 1, further comprising constructing an airspeed pattern based on a plurality of generated airspeed measurements, and deriving a historical airspeed trend based on the airspeed pattern, wherein the comparison further comprises ascertaining that the derived trend is indicative of an approach to land.

8. A system comprising:
   a processing device in communication with memory; and
   one or more tools in communication with the processing device, the tools to:
      dynamically generate a set of flight measurements, including the functional unit to dynamically obtain an altitude measurement, a distance to a destination measurement, and an airspeed measurement of an aerial vehicle;
      store the generated flight measurements in memory;
      compare each flight measurement to a respective threshold value to produce a landing scenario indication, wherein the comparison comprises the functional unit to:
         ascertain that the vehicle is within a defined above ground level based on the altitude measurement;
         ascertain that the vehicle is within a defined distance to a destination based on the distance to a destination measurement; and
         ascertain that the airspeed measurement is below a maximum gear extension speed; and
      convert the produced indicated into a landing gear protocol.

9. The system of claim 8, wherein the tools comprise a microcontroller, the microcontroller to integrate the dynamically generated set, wherein the comparison is performed by the microcontroller.

10. The system of claim 9, further comprising the tools to construct an airspeed pattern based on a plurality of generated airspeed measurements, and derive a historical airspeed trend based on the airspeed pattern, wherein the comparison further comprises the tools to ascertain that the derived trend is indicative of an approach to land.

11. The system of claim 8, wherein the tools comprise a global positioning satellite (GPS) system, the GPS system to dynamically obtain the altitude measurement and the distance to destination measurement.

12. The system of claim 11, further comprising the GPS system to integrate the dynamically generated set, wherein the comparison is performed by the GPS system.

13. The system of claim 8, further comprising the tools to implement the landing gear protocol, including the tools to determine that landing gear of the vehicle is in an unsafe position.

14. The system of claim 13, further comprising the tools to activate a warning signal.

15. The system of claim 13, further comprising the tools to automatically deploy the landing gear.

16. The system of claim 8, further comprising the tools to construct an altitude pattern based on a plurality of generated altitude measurements, and ascertaining that the vehicle is descending from a cruising altitude based on the altitude pattern.

17. A computer program product comprising a computer-readable storage device having computer-readable program code embodied therewith, the program code executable by a processor to:
  dynamically generate a set of flight measurements, including the functional unit to dynamically obtain an altitude measurement, a distance to a destination measurement, and an airspeed measurement of an aerial vehicle;
  store the generated flight measurements in the memory;
  compare each flight measurement to a respective threshold value to produce a landing scenario indication, wherein the comparison comprises program code to:
    ascertain that the vehicle is within a defined above ground level based on the altitude measurement;
    ascertain that the vehicle is within a defined distance to a destination based on the distance to a destination measurement; and
    ascertain that the airspeed measurement is below a maximum gear extension speed; and
  convert the produced indicated into a landing gear protocol.

18. The computer program product of claim 17, further comprising program code to implement the landing gear protocol, including program code to determine that landing gear of the vehicle is in an unsafe position.

19. The computer program product of claim 18, further comprising program code to activate a warning signal.

20. The computer program product of claim 18, further comprising program code to automatically deploy the landing gear.

* * * * *